April 14, 1931.  J. M. BENJAMIN  1,800,205
FASTENING INSERTING MACHINE
Filed Aug. 1, 1923   11 Sheets-Sheet 1

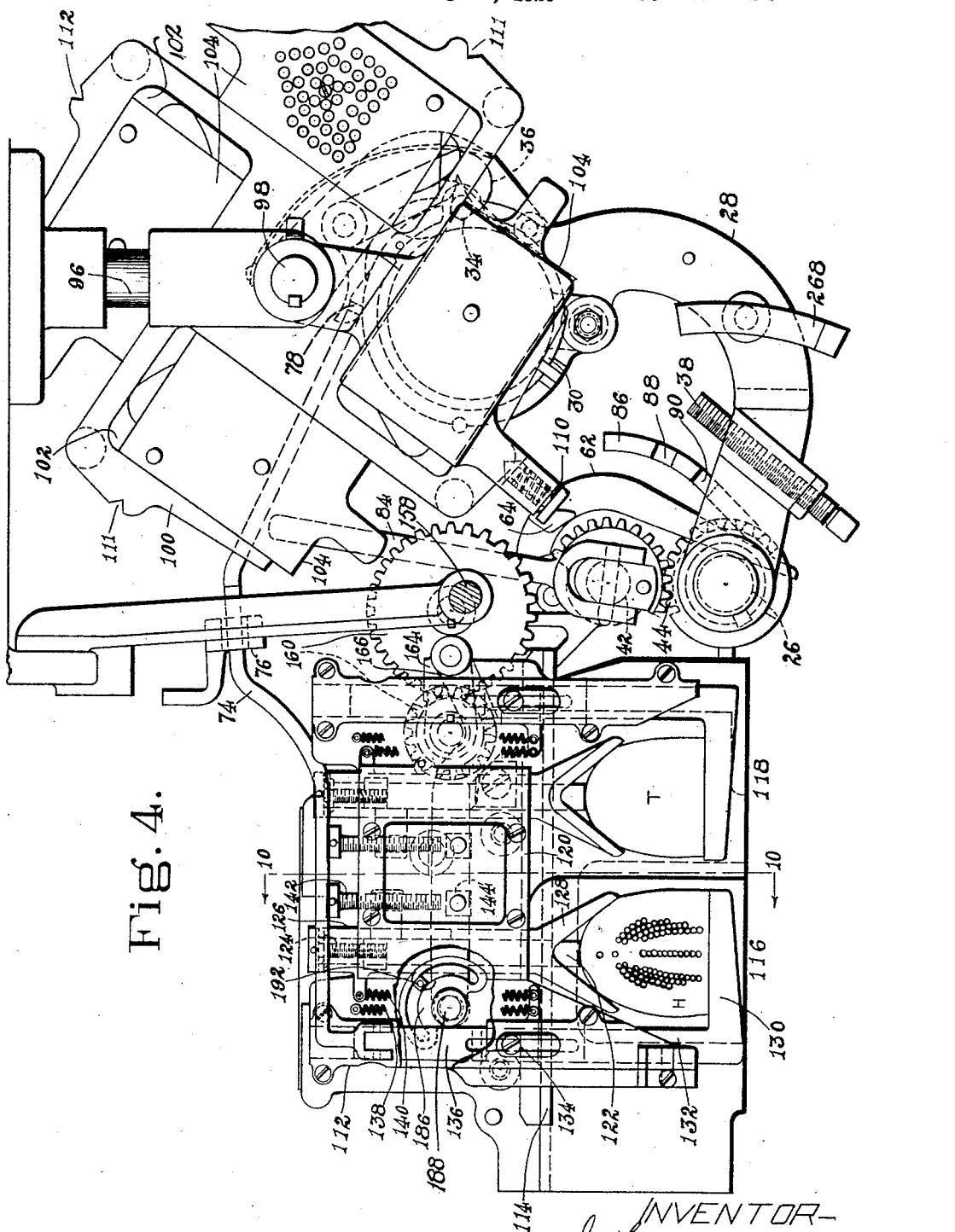

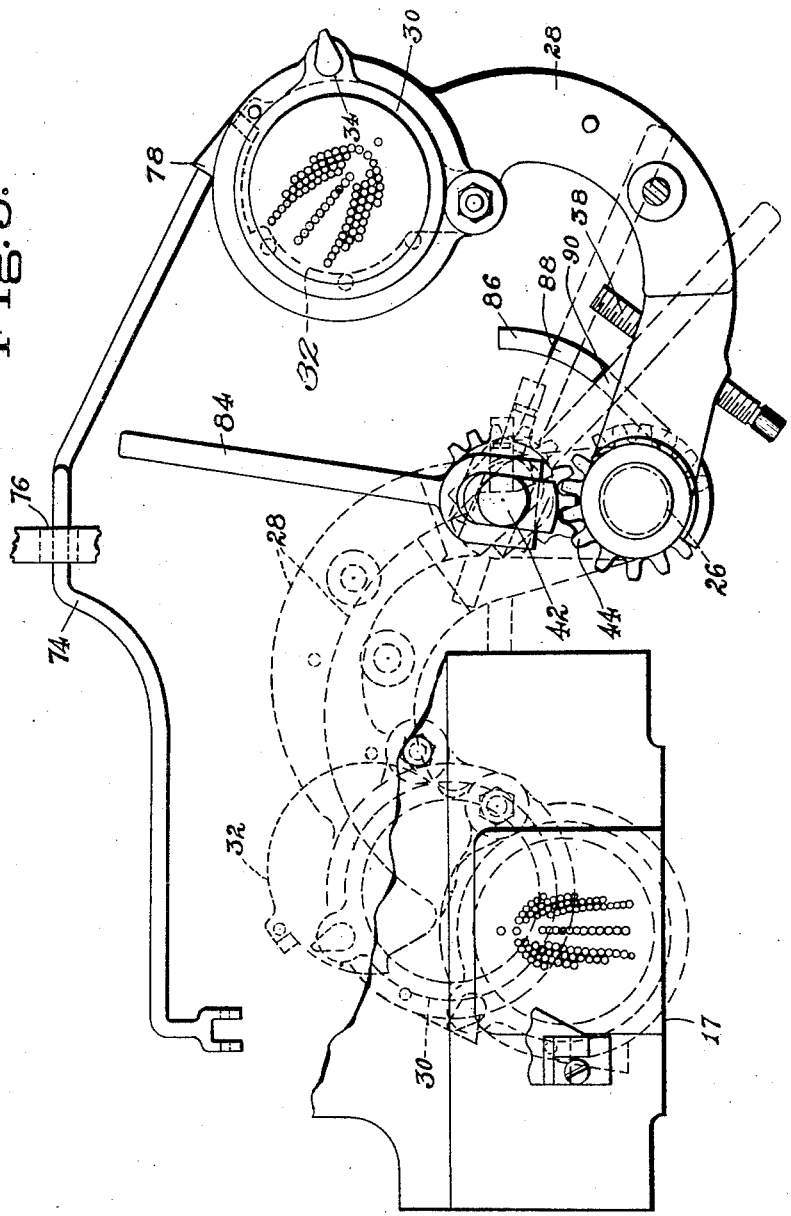

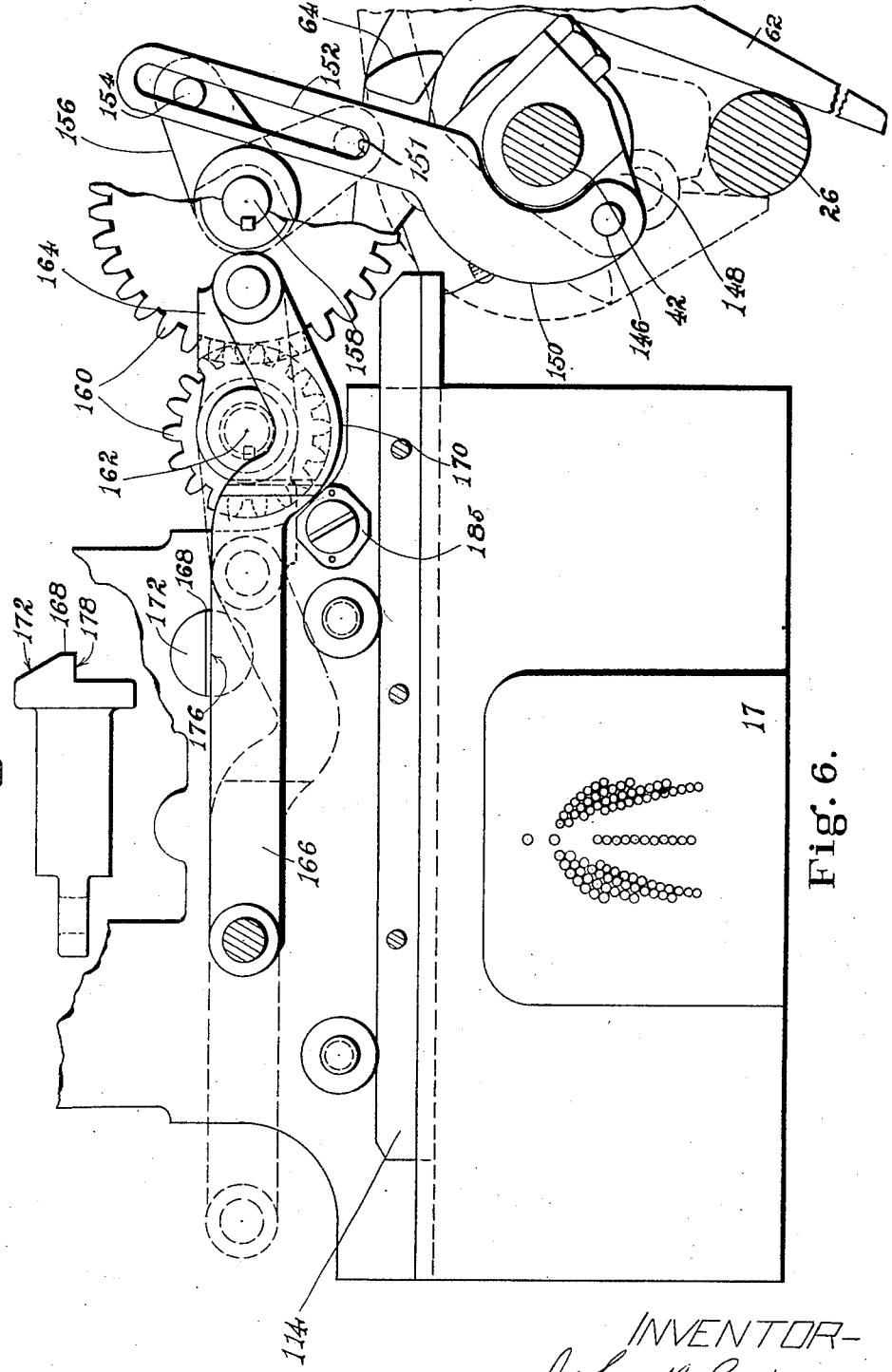

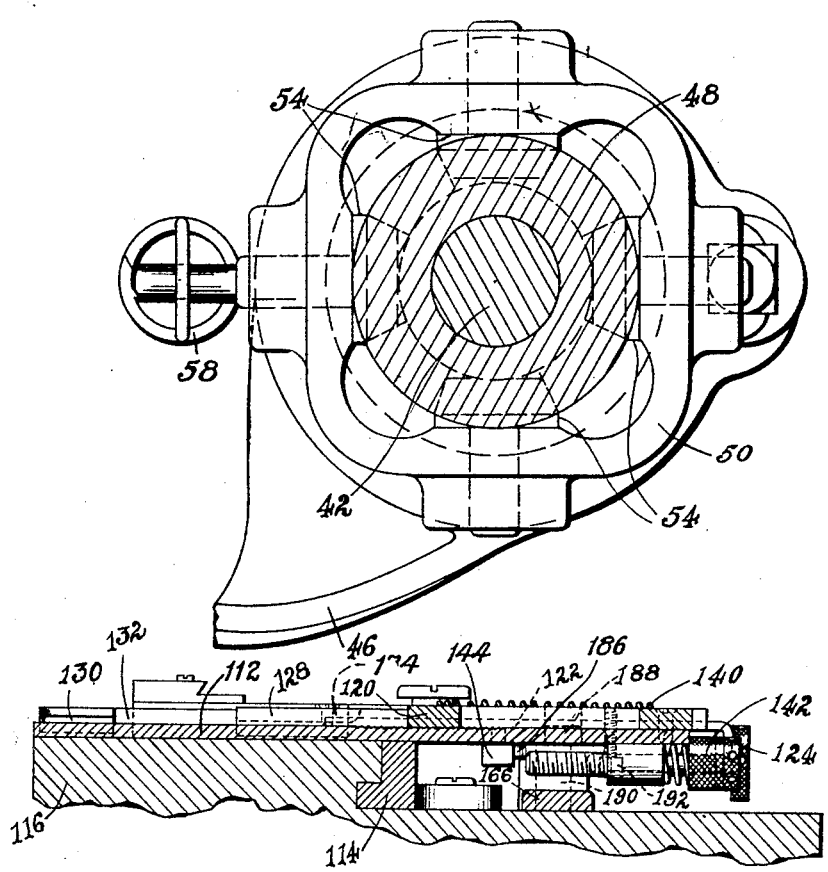

April 14, 1931. J. M. BENJAMIN 1,800,205
FASTENING INSERTING MACHINE
Filed Aug. 1, 1923   11 Sheets-Sheet 9
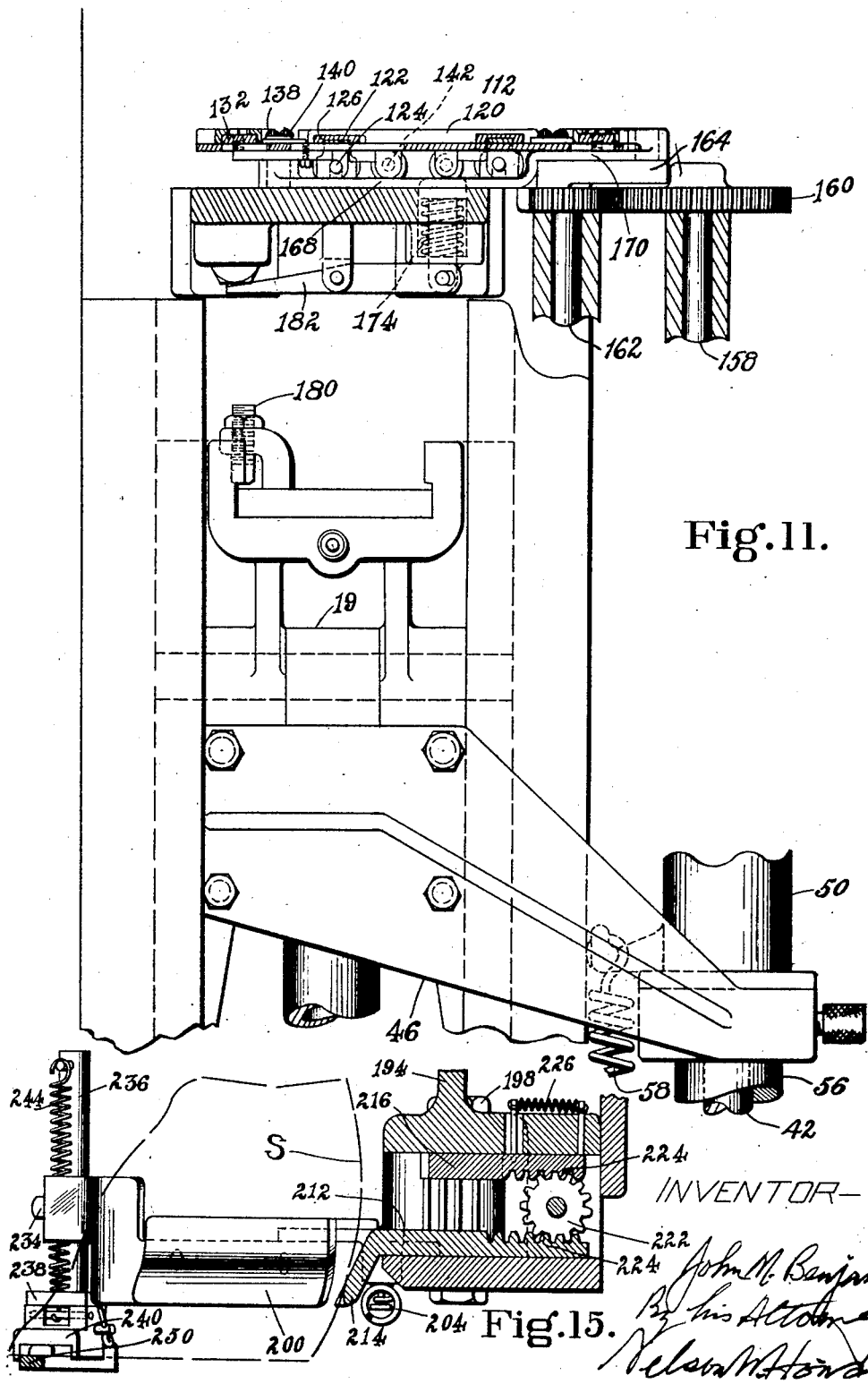

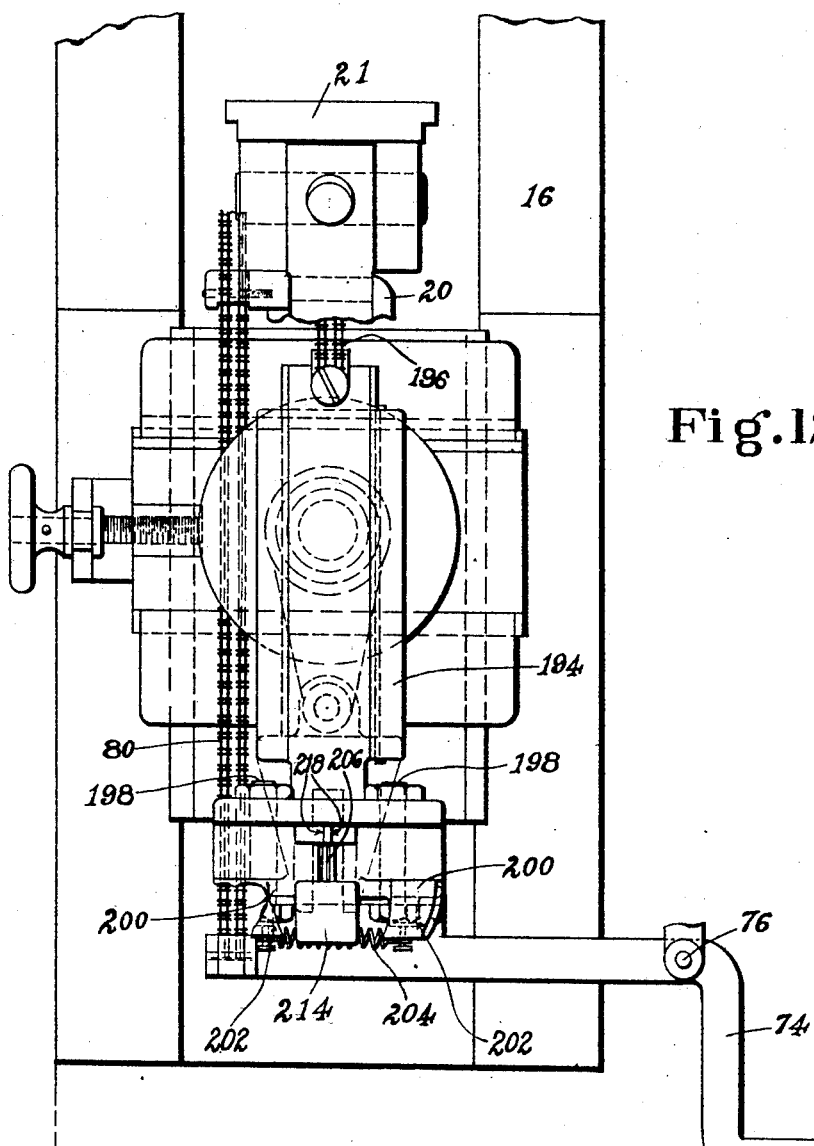

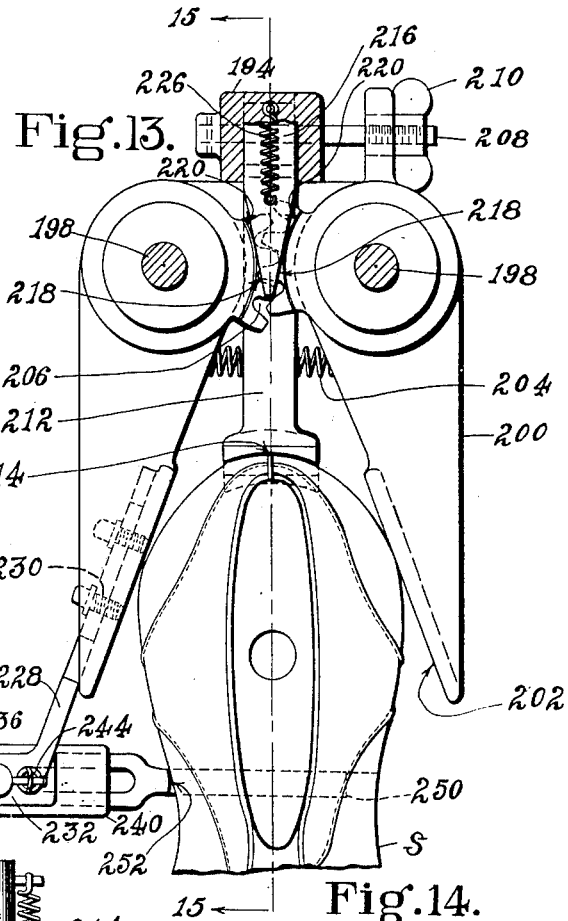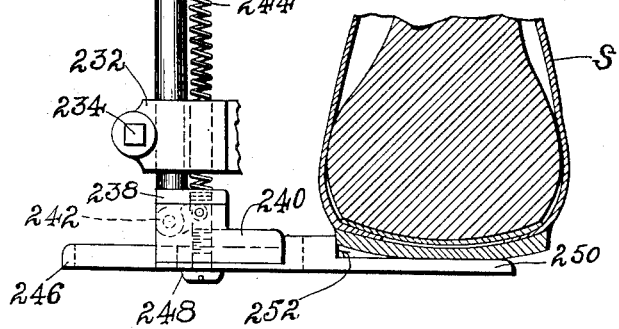

Patented Apr. 14, 1931

1,800,205

UNITED STATES PATENT OFFICE

JOHN M. BENJAMIN, OF BEVERLY, MASSACHUSETTS, ASSIGNOR TO UNITED SHOE MACHINERY CORPORATION, OF PATERSON, NEW JERSEY, A CORPORATION OF NEW JERSEY

FASTENING-INSERTING MACHINE

Application filed August 1, 1923. Serial No. 655,097.

My invention relates to machines for inserting fastenings, as the nails for attaching heels to shoes.

An object of the invention is to improve the mechanism by which the nails or other fastenings are transferred from a source of supply, as a nail-distributor, to the mechanism by which they are inserted in the work. There is provided for this purpose motor means, preferably consisting of springs, in which power is stored in the operation of the machine. The transferring mechanism may be arrested in its nail-delivering movement at a plurality of points, giving the operator or operator's assistant an opportunity to inspect the load of nails in the first position, to determine its completeness, and then, in the second position, to cause their discharge.

The nails are commonly delivered from the source of supply to the transferring device by a set of tubes or conduits, the arrangement of which must be varied as the character of the work changes. A further object of the invention is to facilitate such alteration in the tubes, as by mounting them in sets upon a carrier, so arranged that any set may be brought into conducting relation between the supplying and transferring means.

Another object is to furnish efficient operating connections for the holders which present the heels and top-lifts to the shoes to which they are to be attached, the movement of the holders in one direction preferably being effected from the transferring mechanism through intermediate shafts, cranks and links. In the present instance, the connections are such that the loader-arm, which forms a part of the transferring mechanism and which oscillates, imparts a movement of reciprocation to the holders. The extent of this movement may be varied by an adjustable connection to the holders.

Still another object of the invention is to organize the holder for a heel-portion, as the heel-base or its top-lift, in such a novel manner that it may serve, without adjustment, for presenting different sizes of these portions, and to furnish ready adjustment when the type, as well as the size, changes. To this end, I utilize a gage, which, while normally fixed, may be adjusted, together with a plurality of positioning members yieldable independently of the gage and arranged to contact with the same heel-portion. These members may comprise a back gage, a co-operating yieldable fork, and an opposite yieldable breast-bar. The yieldable members are shown as joined by springs to each other and to a relatively fixed point. These members accommodate themselves to the varying sizes of heel-portions, and only when another type of heel is operated upon need the position of the gage be changed.

The invention also has as an object the provision of work-clamping or positioning members, which locate a shoe for the attachment of its heel. These members adapt themselves to shoes of varying size by engagement with their counter-portions, and have a locking member contacting with them, to render certain their locating effect. The positioning members appear as pivoted jaws, with which a locking wedge co-operates, this wedge being actuated by a back stop movable by the shoe to be heeled.

To insure accurate operations upon a shoe, as the nailing of its heel, it may be desirable to determine its angular relations to the operating mechanism. An object of this invention is to furnish an efficient device for this purpose, and one which does not require adjustment as the sizes of the shoes vary, and which may easily be caused to co-operate accurately with shoes when their type also changes. In accomplishing this, my improved machine has a forepart-gage, into contact with which the shoe may be turned, this gage being best carried upon one of the movable members of the counter-clamping device. However mounted, the gage is preferably so spaced from the counter-clamp that there exists a constant ratio between distances from the longitudinal axis of the shoe operated upon and the points of contact of said shoe with the clamp and gage respectively. With this condition, as the clamping members separate and approach under the influence of shoes of different sizes, the gage is correspondingly shifted, so that its locating action is undisturbed. To extend the application of the gage to different types of shoes, it is made adjustable both longitudinally and transversely of said shoes. I prefer that the forepart-gage have a portion extending transversely of the co-operating shoe and an adjacent gage-surface for contact with the edge of the shoe-bottom. When such a gage is yieldably mounted, a jacked shoe may be swung into engagement with it, and this engagement maintained during movement of the jack in the application of pressure to the work.

The claims for the feature of this machine involving the control of the treadle by the belt-shifter have been withdrawn from the present case for presentation in a divisional application filed December 21, 1929, Serial No. 415,862.

In the accompanying drawings, illustrating one of the many embodiments which my invention may assume, Fig. 1 is a side elevation of a heel-attaching machine, disclosing my invention in one of the many forms which it may assume;

Fig. 4 is a top plan view of the heel and top-lift-holding and nail-loading mechanisms;

Fig. 5 shows, in plan, a detail of the loading mechanism;

Fig. 6 illustrates the actuating connections between the loading mechanism and heel and top-lift-holding mechanism;

Fig. 7 is a detail in side elevation of the latching member for the heel and top-lift-holder;

Fig. 9 is an enlarged horizontal, sectional detail on the line 9—9 of Fig. 3;

Fig. 10 is a vertical section through the heel and top-lift-holder on the line 10—10 of Fig. 4;

Fig. 11 is a front elevation of the connection between the cross-head for the drivers and the loaders-actuating mechanism, this also illustrating the heel and top-lift-holder in transverse section;

Fig. 12 shows the counter-clamp, together with a portion of the jack, in front elevation;

Fig. 13 is a top plan view of the counter-clamp, with the side gage for the work;

Fig. 14 shows this gage in front elevation; and

Fig. 15 is a central vertical section at 15—15, Fig. 13.

Figure 1:
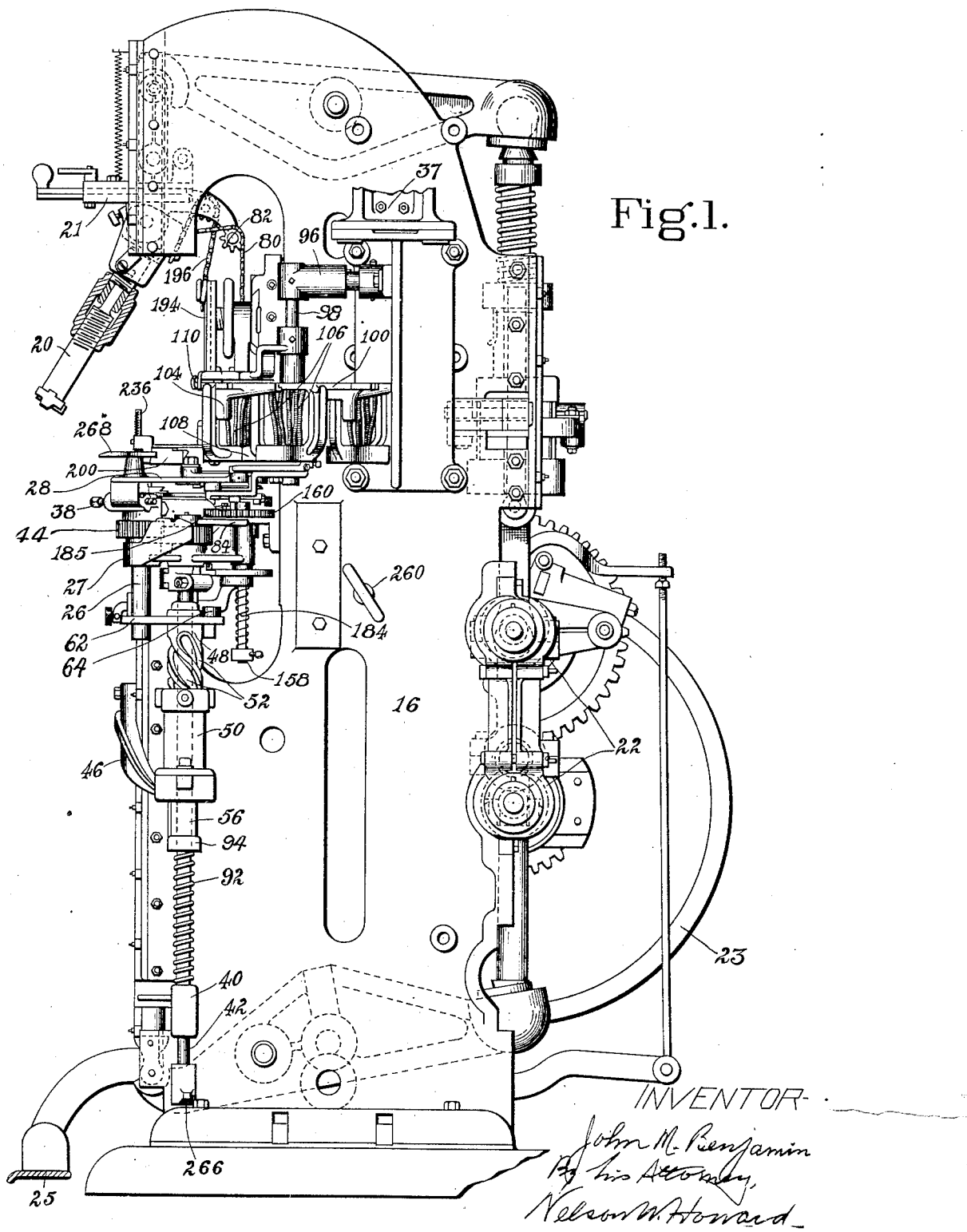
Figure 2:
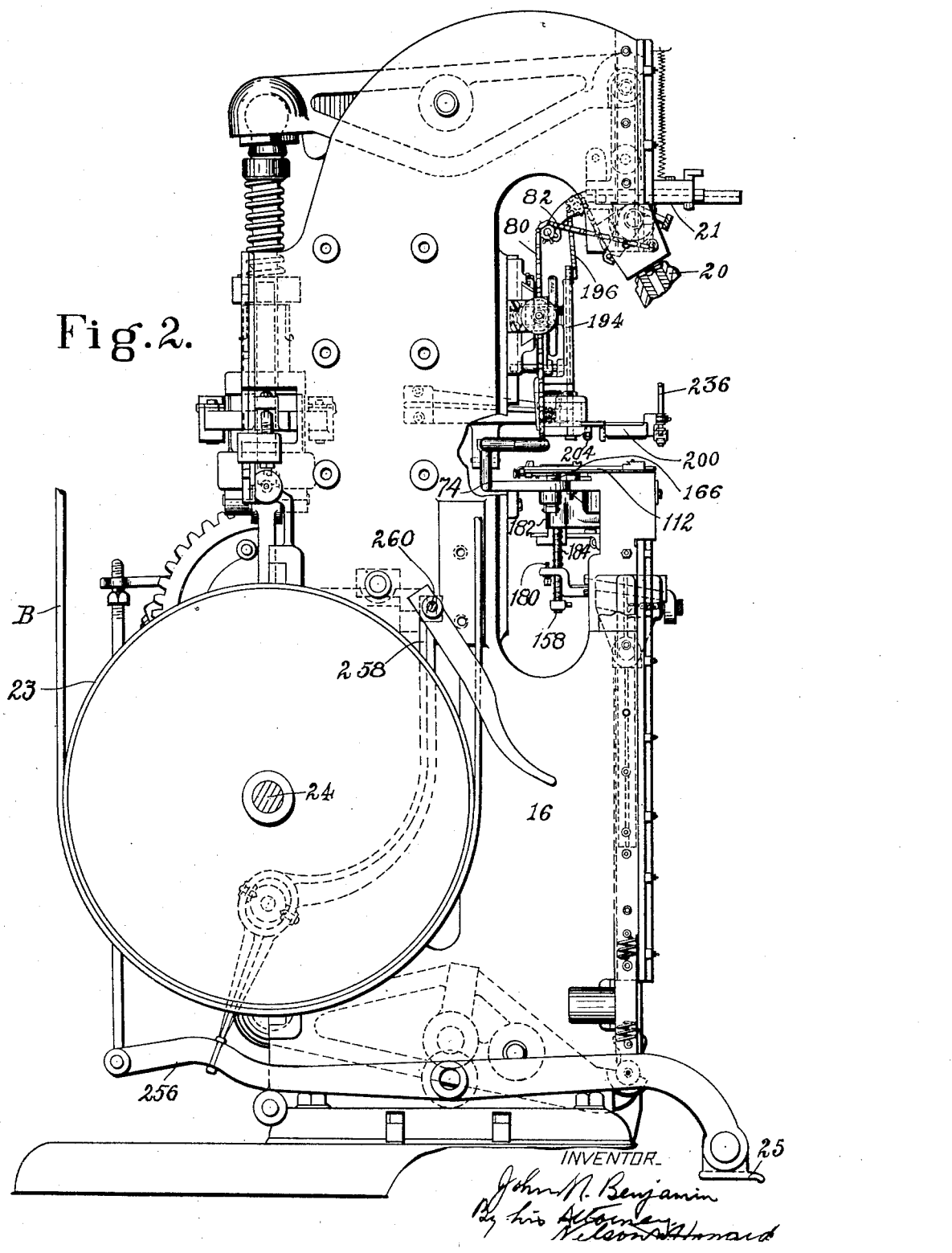
Fig. 2 is a similar view looking from the opposite side of the machine.
Figure 3:
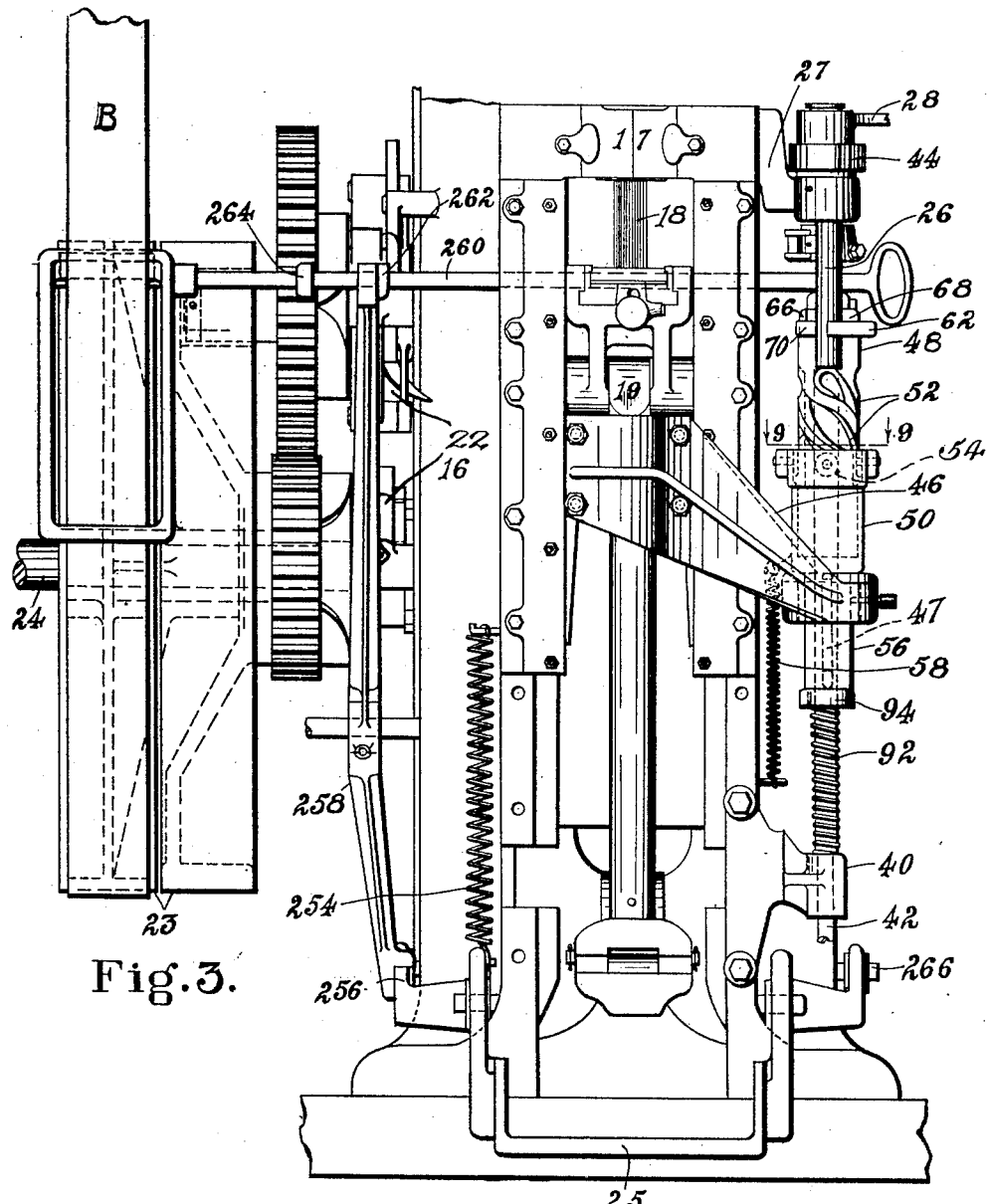
Fig. 3 is a front elevation of the lower portion of the apparatus.

The general organization of the machine, best illustrated in Figs. 1 to 3, inclusive, of the drawings, may be as in Patent No. 1,447,261, Mayo, March 6, 1923, there being mounted upon the frame 16 a die-block 17, with openings of which cooperate drivers 18 carried by a reciprocatory cross-head 19 and acting, when raised, to insert the attaching nails through a heel into the heel-seat of a shoe to which it is to be secured. A jack 20, upon which the shoe thus heeled is supported, is pivoted upon a carrier 21 movable vertically in the frame, and also arranged to swing from a work-receiving to a nailing position and reversely. Vertical movement is imparted to the jack and drivers to respectively press the jacked shoe upon the heel which is to be secured to it, and to force the drivers against the attaching nails to insert them, by connecting elements including clutch mechanism 22 associated with a main driving shaft 24, which carries fast and loose pulleys 23 connected by a belt B to a source of power. A treadle 25 is joined to the clutch mechanism, a depression of the treadle causing its engagement for a single cycle of operation of the machine.

Figure 8:
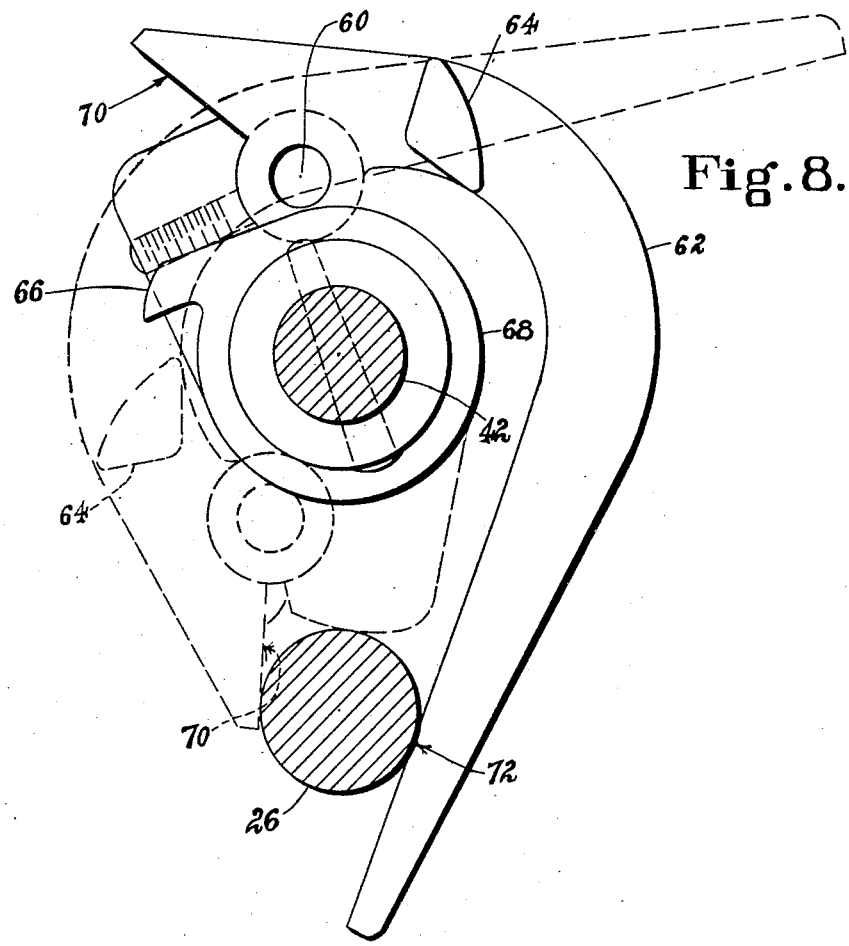
Fig. 8 shows, in top plan, a detail of the actuating mechanism for the loader.

To supply nails to the die-block-openings, there is pivoted to turn about a spindle 26 fixed in a bracket 27 upon the frame, a transferring device consisting of a loader-arm 28 having at its outer extremity a loader-block 30 (Figs. 4 and 5) provided with openings corresponding to those of the die-block. Beneath the loader-block is pivoted the usual shutter 32, which, in the receiving position of the block, supports the nails, this action continuing until the loader-block is over the die-block, at which time the shutter is moved from beneath the loader-block-openings, so that the nails are delivered to the die-block. The extreme of movement of the loader-arm is determined in the nail-receiving position by engagement between a pin 34 and a hooked member 36. When thus located, nails are fed to the loader-block from a distributor, a portion of which appears at 37 in Fig. 1. In the delivery-position, or opposite extreme of movement of the loader-block, when its openings are vertically alined with those of the die-block, a screw 38, threaded through the loader-arm, contacts with the die-block-holder, and permits the exact registration of the openings to be determined. The loader-arm is preferably moved to and from each of its extreme positions, or points in proximity thereto, by power mechanism, which may be as follows:

Mounted to turn in the bracket 27 and a bracket 40 is a shaft 42, geared to the loader-arm at 44 (Figs. 3, 4 and 5). This shaft passes through the end of an arm 46 secured upon the cross-head 19 (Fig. 11). Above this arm, and surrounding the shaft, is a pair of co-operating actuating members 48 and 50. The member 48 consists of a sleeve or cylindrical body rotatable about but held against longitudinal movement along the shaft 42, and having about its exterior a multiple, helical groove 52. Surrounding the member 48 is the generally cylindrical body of the member 50, acting as a nut, having inward projections, which may be in the form of rolls 54 (Fig. 9), operating in the helices 52. From the lower portion of the body 50 is a downward cylindrical extension 56, passing through an opening in the arm 46. To this arm it is splined at 47, so that, while it may have a relative vertical movement, it is maintained against ratation. A spring 58, extending between the frame and the member 50 exerts its tension to draw said member normally downward against the arm 46. Pivoted at 60, upon the upper extremity of the member 48 (Figs. 6 and 8), is a contact-lever 62, having an upwardly extending contact-projection 64, which may be moved, by rotation of the member 48, into engagement with a projection 66 from the periphery of a collar 68 secured to the shaft 42. The lever 62 is provided with surfaces 70 and 72 for contact with the spindle 26. The first of these compels the movement of the projection 64 behind the projection 66 when the lever 62 has been revolved through such an angle that the former of these projections has passed the latter. The second surface 72 compels the disengagement of the projection 64 from 66 after a certain angular movement has been imparted to the collar 68 and therefore to the shaft 42. In its nail-receiving position, the loader-arm is normally latched by a lever 74 (Figs. 4 and 5) pivoted at 76 upon the frame and having one end contacting with a projection 78 from the frame of the loader-block. The opposite end of the latching lever is joined by a chain or other flexible member 80 to the jack 20, it passing over an intermediate guide-roll 82 (Figs. 1 and 2). The connection of the chain to the jack is such that when the latter is swung out for the removal of the heeled shoe, the latching lever is carried away from the projection 78, so that the loader-arm is freed for oscillation from its nail-receiving to its nail-delivering position. The lever may be returned by gravity.

Considering the loader-block to be supplied with nails, and the jack, with a shoe thereon, to be swung into position over the die-block, the operator depresses the treadle 25 to start the machine. The drivers are raised by their cross-head to act upon the load of nails previously supplied to the die-block, and the consequent upward movement of the arm 46 raises the actuating member 50. The projections 54 of this member, acting upon the grooves 52, rotate the member 48, turning the lever 62 in an anti-clockwise direction, as viewed in Fig. 8 of the drawings. The travel of the arm 46 is sufficient to revolve the lever until its projection 64 passes beyond the projection 66 upon the collar 68, and when the point indicated in dotted lines, Fig. 8, has been reached by the projection 64, the surface 70, contacting with the spindle 26, forces this projection behind that upon the collar, locking the member 48 to the shaft. The nails being driven, the travel of the drivers is reversed, and the arm 46 descends. This leaves the member 50 under the influence of the spring 58 which has been tensioned by the elevation of said member. For the time, however, the projections 54 remain at the upper extremities of the grooves 52, since the loader-arm, and therefore the shaft 42 geared to it, is latched against movement as a result of the engagement of the lever 74 with the loader-arm-projection 78. When, however, the heel-attaching operation has been completed, and the operator swings out the jack to remove the heeled shoe, the chain 80, acting upon the lever 74, releases the loader-arm. Now, the elements 42, 68, 48 and 50 are freed, so that the spring 58 may exert its force to draw the member 50 downward into contact with the lowered arm 46. The action of the projections 54 upon the grooves in the member 48 rotates this, and, through the lever 62 and projections 64 and 66, similarly rotates the shaft 42, which, acting on gearing 44, swings the loader-arm 28 over the die-block. Contact at 72 between the lever 62 and the spindle 26 forces the projection 64 clear of the projection 66, leaving the loader-arm in condition to be returned to the nail-receiving position. The just-described actuating effect of the spring 58 carries a handle 84, pivoted upon the upper end of the shaft 42 (Figs. 4 and 5), over an incline at the end of a retaining member 86 and into a notch 88 therein. At this time, the loader-block is in proximity to the die-block, but not quite to the nail-delivering position. The loader-arm is, however, temporarily held by the engagement of the handle with the notch, so that the operator or his assistant can inspect the loader-block to see that it is properly supplied with nails, and then, by turning the handle, carry the arm into an adjacent notch 90, where the full nail-delivering relation has been attained. The shutter is now automatically released, and the operator's assistant may shake the loader-arm by means of the lever, to insure the full delivery of nails to the die-block. He then frees the loader-arm by raising the handle from the notches, allowing a spring 92, which surrounds the shaft 42, being fixed at its opposite extremities to a collar 94 fast on the shaft and to the bracket 40, to return the loader-arm to its nail-receiving position, this spring 92 having been tensioned by the delivering movement of the loader-arm.

It is customary to interpose between the distributing mechanism and the loader-block, in its receiving position, a set of nail-tubes or conduits, which may be applied and removed as a unit, so the arrangement of tubes may correspond to the particular nailing design in use, this design changing with the style and size of shoe. Considerable labor is involved in thus shifting the tube-holders, and, as they are of cast iron and likely to be dropped, they are frequently broken. The present machine is so organized as to reduce these difficulties. Projecting from one side of the frame 16 is a bracket 96 (Figs. 1 and 4), having, depending from its forward extremity, a vertical spindle 98. Rotatable about the spindle is a turret or carrier, consisting of a plate 100, in which are ways 102, here shown as four in number, to receive the upper portion of holders 104 for tubes 106, these tubes terminating in each holder in a foot-plate 108. The tubes of each of the four holders may be arranged in accordance with a different nailing design, the number of designs provided by the four holders being sufficient for all sizes of shoes in a case. By rotating the turret about its spindle, any one of the holders may be brought into operative relation to the distributor and to the loader-block in its nail-receiving position, and there temporarily retained by a spring-latch 110 carried upon the spindle 98 and which may engage any one of a series of notches 111 in the plate 100. With this arrangement, the operator is relieved of the burden of removing from the machine and replacing sets of nail-tubes during the heeling of an entire case or more of shoes.

To successively present a heel and top-lift in attaching relation with respect to the jack and die-block, there is mounted upon the die-block-holder a reciprocatory plate 112 movable in ways 114 and carrying, side by side, a heel-holder 116 and a top-lift-holder 118 (Figs. 4, 10 and 11). Since these holders are identical in structure, but one will be described. Arranged to slide between the plate 112 and a cover-plate 120 secured thereto is a gage-bar 122, having its forward extremity lying adjacent to the heel-portion to be nailed and its opposite end engaged by the head of a screw 124 threaded into the back of the plate 112. Operating over this bar 122, between it and the cover-plate 120, is the stem 126 of a fork 128, the arms of this fork forming equal angles with the sides of the gage-bar. Opposite the gage-bar and fork is a breast-bar 130, projecting at right angles from a rearwardly extending stem 132. The stem is fixed by a screw-and-slot connection 134 to a section 136 guided in ways in the plate 112. A spring 138, secured at one end to a point fixed relatively to the breast-bar, as the plate, and at the other to a lug from the section 136, serves to draw said breast-bar toward the gage-bar and fork. The normal relation of the breast-bar to the associated members is variable by the slot-and-screw connection 134, which alters the effective length of the stem. From the lug upon the section 136, a second spring 140 extends to an opposite lug upon the fork-stem 126, and causes a screw 142, threaded through a lug from the stem 126 at the side opposite the point of attachment of the spring 140, to be drawn against a stop-projection 144 upon the plate 112. The screw 142 variably controls the inward limit of travel of the fork 128 toward the end of the gage-bar 122 and the opposed breast-bar 130. These springs 138 and 140 provide a compact tension device, which permits the breast-bar to be drawn forwardly from the gage-bar 122 by contact of the breast of a heel which is to be held, the fork at this time being in its extreme forward position. Then, upon the release of the heel, both springs act to carry the breast-bar back, at the same time allowing the fork to yield until the heel is seated against and positioned by the bar 122. Since for the same type of shoe the distance of the rear nail of the attaching set from the back of the heel and counter is a constant for all sizes of heels and top-lifts, this arrangement allows a single adjustment of the bar 122 to correctly position all the heel-portions, change being necessary only when the style of shoe being heeled changes. The position of the fork 128, under the control of the screw 142, and that of the breast-bar 130, under the influence of the screw-and-slot connection 134, are so fixed that these contact members will properly engage and hold the smallest heel and top-lift which are to be attached, the yield which occurs upon the insertion of the heel-portion permitting the introduction of the larger sizes.

The movement of the plate 112 to both the heel and top-lift-presenting positions is preferably effected by power means, the heel-holder 116 being carried over the die-block under the influence of the loader mechanism, while the reverse movement may be accomplished by a spring tensioned in the first-mentioned travel. Pivoted at 146 upon a short crank-arm 148 fixed to the actuating shaft 42 of the loader-arm is a link 150, having in it a longitudinal slot 152 (Fig. 6). When the loader-arm is carried to its nail-delivering position, the forward extremity 151 of this slot, or that toward the front of the machine, contacts with a pin 154 rising from a crank 156 secured upon a shaft 158 journaled in brackets upon the frame. The shaft 158 is geared at 160 to a short vertical shaft 162 carried at the rear of the die-block-holder. Projecting from the shaft 162 is a crank 164 having articulated to it a link 166, the opposite extremity of which is pivoted to the plate 112. At the close of a heeling operation, the top-lift-holder 118 is in the presenting position over the die-block, and the actuating elements at that time have the relations indicated in dotted lines in Fig. 6. When the operator draws out the jack to remove the heeled shoe, the loader-arm is actuated, as already described, to deliver its load of nails to the die-block. During the rotation of the shaft 42 in the effecting of this delivery, the end 151 of the slot 152, by its contact which the pin 154, turns the crank 156 from the dotted-line position in Fig. 6 to the full-line position. Through the gearing 160 the crank 164 is turned, this causing the link 166 to be swung from the dotted-line position, first rearwardly above a latching projection 168, an upwardly offset portion 170 (Fig. 11) of the link at this time passing freely over this projection. In the completion of the travel of the crank 164, the link moves forward and strikes an inclined face 172 of the projection, pressing this down against a spring 174, which holds it normally raised. As the link passes over the projection, it assumes the full-line position of Fig. 6, when its edge 176 is caught against a vertical face 178 of the latch. Thus, the plate is retained until the cross-head 19 rises in the driving of the nails into the heel which has been brought over the die-block as a result of the movement of the heel and top-lift-holder, just described. At this time, an adjustable member 180, mounted upon the cross-head, contacts with a lever 182 fulcrumed beneath the die-block and pivoted to the latch. The consequent movement of the lever 182 depresses the latch, releasing the link 166 and permitting a spring 184 (Fig. 1), surrounding the shaft 158 and tensioned in the previous movement of the plate 112, to turn the shaft. This, through the gearing 160, crank 164 and link 166, carries the plate to its top-lift-presenting position, the elements again occupying the dotted-line positions of Fig. 6. The limit of movement in this direction may be determined by the engagement of the crank 164 with a projection 185 from the die-block-holder. Since this contact occurs at the dead center of the crank, any rebound caused by its contact with the stop will have little effect upon the position of the top-lift-holder.

To insure the correct alinement of the heel and top-lift-holders with the die-block and jack, the plate 112 may be varied in position by an adjustable connection to the link 166. This I have shown in Figs. 4 and 10 as furnished by a segment 186 having at its upper side a pin 188 arranged to turn in the plate, while depending from the segment is a pin 190, to which the link 166 is connected, and being eccentrically related to the pin 188. The segment may be fixed at different angles by a clamping screw 192 passing through an arcuate slot in the segment and being threaded into the plate. Adjustment of this segment varies the effective length of the link 166, and consequently the relation of the plate 112 to the die-block.

The counter-engaging clamp, which positions the jacked shoe over the die-block, is mounted upon the usual vertically movable slide 194 joined to the jack by a chain 196 (Figs. 1, 2 and 12). Pivoted at 198, 198 upon the slide are opposite jaws 200, 200 (Figs. 13 and 15) having forwardly diverging surfaces 202, 202 for engagement with opposite sides of the counter-portion of the shoe upon the jack 20. These jaws are drawn toward each other by a spring 204 connecting them, moving together in constant angular relation, under the influence of intermeshing gear-segments 206, 206. The inward extreme of movement of the jaws is adjustably determined by a screw 208 fixed horizontally in the slide and extending loosely through an opening in a lug at the rear of one of the arms, with the outer side of which lug contacts a nut 210 threaded upon the screw. Means is provided to fix the arms against separation when the shoe introduced between them has reached its correct rearward position, the thus locked jaws serving to hold the shoe firmly for the heeling operation. For this purpose, there is situated between the jaws a gage or back stop 212 movable horizontally upon the slide 194 and having a curved forward end 214 for engagement with the rear of the counter-portion of the shoe. Arranged to reciprocate upon the slide, above the stop 212, is a locking member, shown as in the form of a bar 216 having oppositely inclined surfaces 218, 218 for engagement with curved surfaces 220, 220 formed upon the inner adjacent edges of the jaws. The back stop and locking bar are compelled to move together by a pinion 222 rotatable upon the slide and meshing with upper and lower racks 224, 224 formed upon the back stop and bar. A spring 226, connecting the bar 216 and the slide 194, holds the former normally withdrawn from engagement with the jaw-surfaces 220 and the back stop 212 in its extreme forward position. When the shoe is thrust in between the jaws upon the jack, it first separates these against the tension of the spring 204, finally coming into contact with the back stop 212. This is moved rearwardly until the shoe assumes its correct relation from front to rear of the die-block, at which time the bar 216, which has been carried in by the gearing 222, 224, as the back stop retreated, brings the inclined surfaces 218, 218 against the jaw-surfaces 220, 220, causing these to be locked against movement, and thus fixing the jaw-surfaces 202, 202 against separation, to hold the shoe laterally for the attaching operation. Since any separating pressure upon the jaws urges the curved surfaces 220 against the wedge-surfaces 218 in a direction tending to draw in the wedge, the locking effect is thereby increased. Force applied in the opposite direction so moves the surfaces 220 as to free the wedge, releasing the lock so that the jaws are always subject to the influence of the spring 204.

In addition to the locating effect transversely of the die-block and rearwardly thereof, afforded by the counter-clamp with its back stop, it is desirable that the operator have means for determining the correct angular relation of the jacked shoe. To this end, there is mounted upon one of the jaws 200 a supporting bar 228, adjustable forwardly and rearwardly by a slot-and-screw connection 230 between it and the jaw. This bar 228 has an enlarged, divided end-portion 232, provided with a clamping screw 234 to draw the parts together and hold, for adjustment perpendicularly with respect to the bottom of the shoe operated upon, the shank 236 of a carrier member 238. Upon this upper portion of the carrier member is pivoted at 242 a lower section 240, held normally raised in a generally horizontal position by a spring 244 extending between the section 240 and a pin projecting from the side of the shank. Mounted upon the carrier-section 240 is a gage-bar 246, adjustable transversely of the die-block by a slot-and-screw connection 248. The bar 246 has an end-portion 250, which extends below the shank-portion of the shoe carried by the jack 20 when this jack is swung in to the nailing position. At the outer side of the main portion of the gage-bar is a contact-surface 252, of such height that when the portion 250 is in contact with the shank of the jacked shoe, the edge of the sole may rest against this surface. The end-portion 250, by its engagement with the shank, having located the gage-surface 252 to receive the contact of the sole-edge, may yield vertically in the operation of the machine, because of the spring-connection 244. A point may be chosen along the forepart of a shoe, at which the distance between the longitudinal axis and the sole-edge, measured along a perpendicular to such axis, bears a constant ratio to the distance between said axis and the point of contact of the surface 202 of the clamp-jaw as this rests against the counter-portion of the shoe in its final or locked position, this last-mentioned distance being taken perpendicularly to the contact-face of the jaw. Consequently, if the bar 228 be adjusted from front to rear of the die-block by the connection 230, and the gage-bar 246 be correspondingly adjusted transversely to bring the contact-surface 252 to the proper point, the operator, after rearward movement of the back stop 212 has locked the clamp-jaws in contact with the counter-portion of the jacked shoe, can, by turning said shoe until the edge of the sole touches the surface 252, be assured that the work is in the correct angular relation to the heel and top-lift in their holders and to the die-block-openings. Moreover, this portion of the shoe, at which the contact-surface 252 is fixed, is practically symmetrical for both the right and left shoe, so no adjustment of this gage is needed for the heeling of an entire case-lot, of which the shoes are all of the same type.

Some clutch mechanisms, as that disclosed in the Mayo patent previously mentioned, are so organized that if the member which controls them, as the treadle 25, is actuated when the machine is not in operation, the clutch is released and assumes an abnormal position, in which the apparatus cannot be started until it has been brought back to normal by some such act as turning it over with a bar. To avoid this difficulty, I associate with the driving mechanism means for locking the treadle at all times, other than when the clutch can be engaged properly. The treadle is held normally raised to release the clutch by a spring 254 (Fig. 3) extending between said treadle and the frame. Projecting from one side of the treadle is an arm 256, horizontally alined with a recess in the side of a lever 258 fulcrumed upon the frame and having an opening through which passes a rod 260 for shifting the driving belt B upon the pulleys 23 between active and inactive positions. Fixed upon this rod, at opposite sides of the lever 258, are contact members 262 and 264. When the belt is upon the loose pulley and the machine out of operation, the contact member 262 bears against the lever, and holds the lower end of the latter so that the recess receives the arm 256, locking the treadle against depression. When the rod is moved to the right, as seen in Fig. 3, to bring the belt to the fast pulley, the member 264 contacts with the lever, carrying the recess clear of the arm 256, so that, the machine now being in condition for operation, the treadle is freed for depression.

A further device for locking the treadle consists of an arm 266 fixed to the bottom of the actuating shaft 42 of the loader and lying in a plane just below a portion of the treadle (Fig. 1). When the loader-arm has been turned through such an angle that it might be struck in the pressure-applying movement of the jack, were the machine operated, this arm comes below the treadle, and arrests its movement, not freeing it until the loader has been moved clear of the die-block.

At the beginning of a cycle of operation of the machine, the heel-holder 116 is over the die-block, with its spring 184 under tension. The operator's assistant has supplied to this heel-holder and to the holder 118 a heel H and top-lift T, respectively, the gage-bars 122 having been adjusted for the particular type of shoe which is to be operated upon, and the fork 128 and the breast-bar 130 so normally spaced from one another that they will grasp properly the smallest of the heels and top-lifts which are to be attached. The loader-arm is in its nail-receiving position, a set of tubes 106 arranged according to the correct nailing design having been brought into supplying relation with it by turning the turret-plate 100. The loader-block 30 has at this time received its load of nails. The jack 20 being out, the operator places a shoe S to be heeled upon it, and swings it in to the attaching position, this allowing the latching lever 74 to go into retaining engagement with the projection 78 of the loader-arm. The desired angle of the shoe is determined by the gage-surface 252. Now, a depression of the treadle 25, the rod 260 being so positioned as to place the driving belt upon the fast pulley and release the treadle, causes the engagement of the clutch mechanism 22. The jack descends to bring the heel-seat of the jacked shoe into engagement with the heel in the holder 116, and the cross-head 19 rises, carrying the drivers through the die-block-openings, to force through the heel and into the heel-seat the nails which have been previously supplied to such openings. The elevation of the arm 46 with the drivers causes the actuating members 48 and 50 to move the lever 62 to its latched position, storing power in the spring 58. The contact member 180 strikes the lever 182 to depress the latching projection 168, thus releasing the link 166 of the heel and top-lift plate 112. When the drivers descend and the jack is raised, the spring 184 exerts its force to carry the top-lift-holder 118 into presenting position over the die-block. Thereupon the operator again depresses the treadle, and the top-lift is spanked on the projecting extremities of the nails in the previously attached heel. The heeling of this shoe having been completed, the operator swings out the jack, to remove the work. In this movement, the chain 80 draws the lever 74 away from the loader-arm-projection 78, freeing said loader-arm, so that the spring 58, through the actuating members 48 and 50, rotates the loader-arm until the handle 84 enters the depression 88. The operator's assistant then advances the handle to the notch 90, and oscillates the handle, to insure the delivery of nails to the die-block. This having been done, he releases the handle, and the loader-arm is returned to its position beneath the supplying tubes 106 by the spring 92, which was put under tension during the nail-delivering movement. As the nail-receiving position of the loader-arm is approached, a cam member 268 (Fig. 4) upon it trips the distributor, so that a load of nails is released and falls through the tubes 106 into the openings of the block 30. During the nail-delivering movement of the loader-arm, the connections between the shaft 42 and the link 166 carried the heel-holder 116 back over the die-block, latching it by engagement of the link with the projection 168, and again tensioning the spring 184 for the succeeding top-lift-presenting action. The machine is now ready for the succeeding operation.

Having described my invention, what I claim as new and desire to secure by Letters Patent of the United States is:

1. In a machine of the class described, fastening-inserting mechanism, a movable fastening-transferring device, motor means for the transferring device, and means made effective during the action of the fastening-inserting mechanism for storing power in the motor means.

2. In a machine of the class described, nailing mechanism, a nail-transferring device movable in opposite directions, a plurality of motor means for the transferring device, and means made effective during the action of the nailing mechanism for storing power in one motor means to move the transferring device in one direction, the action of said motor means storing power in another motor means to move the transferring device in the opposite direction.

3. In a machine of the class described, nailing mechanism, a nail-transferring device co-operating therewith, and a spring acting to move the transferring device from a nail-receiving position to a delivering position at the nailing mechanism.

4. In a machine of the class described, nailing mechanism, a nail-transferring device, a spring acting to move the transferring device from a nail-receiving to a nail-delivering position, and means arranged to place the spring under tension during the action of the nailing mechanism.

5. In a machine of the class described, nailing mechanism, a nail-transferring device, a spring acting to move the transferring device from a nail-receiving to a nail-delivering position, and a spring tensioned during such movement and acting to move the transferring device in the opposite direction.

6. The combination with nailing mechanism, of a movable nail-transferring device, a rotary actuating member for the transferring device, a reciprocatory actuating member, means for reciprocating the last-mentioned actuating member in the operation of the nailing mechanism, and connections between the reciprocatory and rotary actuating mechanisms to rotate the latter.

7. In a nailing machine, the combination with reciprocatory nail-driving mechanism, of a movable nail-transferring device, a rotary actuating member for the transferring device, a reciprocatory actuating member connected to the rotary member, connections between the nail-driving mechanism and reciprocatory actuating member to move said member in one direction, and a spring arranged to move it in the opposite direction.

8. The combination with nailing mechanism, of a movable nail-transferring device, a rotary actuating member for the transferring device, a reciprocatory actuating member, means for reciprocating the last-mentioned actuating member in the operation of the nailing mechanism, and a screw and nut connecting the members.

9. The combination with nailing mechanism, of a movable nail-transferring device, actuating mechanism therefor, and means arranged to move the actuating mechanism into initial engagement with the transferring device and to store power in said actuating mechanism.

10. The combination with nailing mechanism, of a movable nail-transferring device, actuating mechanism therefor, means arranged to move the actuating mechanism into initial engagement with the transferring device and to store power in said actuating mechanism, and means arranged to disengage the actuating mechanism from the transferring device at the termination of its actuating movement.

11. The combination with nailing mechanism, of a movable nail-transferring device, a rotary actuating member, a member for connecting the rotary member to the transferring device for a predetermined extent of movement, a reciprocatory actuating member, means for reciprocating the last-mentioned actuating member in the operation of the nailing mechanism, and connections between the reciprocatory and rotary actuating mechanisms to rotate the latter.

12. The combination with nailing mechanism, of a movable nail-transferring device, a rotary actuating member, a member for connecting the rotary member to the transferring device for a predetermined extent of movement, a contact device for compelling the engagement and disengagement of the connecting member at its extremes of movement, a reciprocatory actuating member, means for reciprocating the last-mentioned actuating member in the operation of the nailing mechanism, and connections between the reciprocatory and rotary actuating mechanism to rotate the latter.

13. In a heel-attaching machine, reciprocatory nail-drivers, an oscillatory loader-arm, an actuating shaft therefor, a spring tensioned in the movement of the drivers, and connections between the spring and shaft acting to rotate said shaft in one direction.

14. In a heel-attaching machine, reciprocatory nail-drivers, an oscillatory loader-arm, an actuating shaft therefor, a spring tensioned in the movement of the drivers, connections between the spring and shaft acting to rotate said shaft in one direction, and a spring tensioned in the rotation of the shaft for turning said shaft in the opposite direction.

15. In a heel-attaching machine, reciprocatory nail-drivers, an oscillatory loader-arm, an actuating shaft therefor, a sleeve rotatable upon the shaft and provided with a helical groove, a sleeve mounted to reciprocate along the shaft and having a projection entering the groove, a member for connecting and disconnecting the rotatable sleeve and shaft, a spring acting upon the reciprocatory sleeve, and a member movable with the drivers for moving said sleeve.

16. In a heel-attaching machine, reciprocatory nail-drivers, an oscillatory loader-arm, an actuating shaft therefor, a sleeve rotatable upon the shaft and provided with a helical groove, a sleeve mounted to reciprocate along the shaft and having a projection entering the groove, a lever for connecting and disconnecting the rotatable sleeve and shaft, a member with which the lever contacts to cause its engagement and disengagement, a spring acting upon the reciprocatory sleeve, and a member movable with the drivers for moving said reciprocatory sleeve.

17. In a machine of the class described, fastening-inserting mechanism, a fastening-transferring member movable between receiving and delivering positions, power mechanism for causing such movement, means for temporarily retaining the transferring member in opposite extreme positions against the action of the power mechanism, and means arranged to release the retaining means to permit the power mechanism to act.

18. In a machine of the class described, nailing mechanism, a movable work-support co-operating therewith, a nail-transferring member movable between receiving and delivering positions, power mechanism for causing such movement, means for temporarily retaining the transferring member in one of its extreme positions against the action of the power mechanism, and connections to the work-support to release the retaining member.

19. In a machine of the class described, nailing mechanism, a movable work-support co-operating therewith, a nail-transferring member movable between receiving and delivering positions, a spring for causing such movement, a latch for the transferring member acting to resist the tension of the spring, and connections to the work-support for moving the latch.

20. In a heel-attaching machine, reciprocatory nail-drivers, a jack co-operating therewith, a loader-arm arranged to oscillate between nail-receiving and nail-delivering positions, a lever for latching the loader-arm in its receiving position, an actuating shaft for the loader-arm, a spring tensioned in the movement of the drivers, connections between the spring and shaft, and connections between the latching lever and jack.

21. In a machine of the class described, nailing mechanism, a nail-transferring member, means for moving the transferring member toward the nailing mechanism, and means arranged to arrest movement of the transferring member at a plurality of points.

22. In a machine of the class described, nailing mechanism, a nail-transferring member movable from a nail-receiving position to a position in which it delivers nails to the nailing mechanism, power mechanism for moving the transferring member toward the nailing mechanism, and means arranged to first arrest such movement adjacent to the nailing mechanism but short of the delivering position and then to determine such delivering position.

23. In a heel-attaching machine, nailing mechanism, a loader-arm movable from a nail-receiving position into co-operation with the nailing mechanism, a pivoted member movable with the loader-arm, and a retaining member having a plurality of depressions, any one of which the pivoted member may enter to determine different stopping positions of the loader-arm adjacent to the nailing mechanism.

24. In a heel-attaching machine, nailing mechanism, a loader-arm movable from a nail-receiving position into co-operation with the nailing mechanism, a handle by which the loader-arm may be moved, and a plurality of stop devices which the handle may engage when the loader-arm is in co-operation with the nailing mechanism.

25. In a machine of the class described, nailing mechanism, mechanism for supplying nails, mechanism for transferring nails from the supplying mechanism to the nailing mechanism, a movable carrier, and a plurality of sets of nail-conduits mounted upon the carrier, any one of which sets may be brought by the movement of the carrier into conducting relation between the supplying mechanism and transferring mechanism.

26. A nailing machine comprising nailing mechanism, a nail-distributor, a loading device movable between the distributor and nailing mechanism, and a turret provided with a plurality of sets of nail-tubes, any one of which sets may be brought into co-operation with the distributor and loading device.

27. A nailing machine comprising nailing mechanism, a nail-distributor, a loading device movable between the distributor and nailing mechanism, a rotatable turret mounted between the distributor and loading device, and a plurality of holders carried by the turret and each having nail-tubes arranged in accordance with a different design and movable in the rotation of the turret to connect the distributor and loading device.

28. In a heel-attaching machine, nailing mechanism, a movable heel and top-lift-holder associated therewith, a nail-loader movable into cooperation with the nailing mechanism, actuating shafts for the heel and top-lift-holder and loader respectively, and operating connections between said shafts.

29. In a heel-attaching machine, nailing mechanism, a movable heel and top-lift-holder accociated therewith, a nail-loader movable into co-operation with the nailing mechanism, actuating shafts for the heel and top-lift-holder and loader respectively, a crank carried by each shaft, operating connections between the loader-shaft-crank and the holder-shaft, and connections between the holder-shaft-crank and holder.

30. In a heel-attaching machine, nailing mechanism, a movable heel and top-lift-holder associated therewith, a nail-loader movable into co-operation with the nailing mechanism, actuating shafts for the heel and top-lift-holder and loader respectively, a crank carried by each shaft, operating connections including a slotted link between the loader-shaft-crank and the holder-shaft, and a link connecting the holder-shaft-crank and holder.

31. In a heel-attaching machine, nailing mechanism, a loader co-operating therewith, a movable heel and top-lift-holder, links joined to the loader and holder respectively, and connections between the links permitting independent movement thereof.

32. In a heel-attaching machine, nailing mechanism, a movable heel and top-lift-holder associated therewith, actuating connections for the holder including a link, and a retaining member for the holder contacting with the link.

33. In a heel-attaching machine, nailing mechanism, a movable heel and top-lift-holder associated therewith, actuating connections for the holder, and a yieldable retaining member for the holder over which a portion of the connections travels in opposite directions, said connections being formed to clear the retaining member during movement in one direction and acting to force it to one side during movement in the opposite direction.

34. In a heel-attaching machine, nail-driving mechanism, an oscillatory loader-arm co-operating therewith, a reciprocatory heel and top-lift-holder, and connections to the loader-arm acting in its oscillation to reciprocate the holder.

35. The combination with a movable plate, of heel and top-lift-holders mounted upon the plate, an actuating member for the plate, and a connecting device for the actuating member carried by the plate and adjustable to vary its effect upon said actuating member.

36. The combination with a movable plate, of heel and top-lift-holders mounted upon the plate, an actuating link, and an eccentric device connecting the link and plate.

37. In a holder for heel-portions, a normally fixed, rigid gage for contact with a heel-portion, and a plurality of positioning members yieldable bodily independently of the gage and of each other and arranged to contact with the same heel-portion as said gage.

38. In a holder for heel-portions, a normally fixed, rigid gage for contact with a heel-portion, a plurality of positioning members yieldable independently of the gage and of each other and arranged to contact with the same heel-portion as said gage, and means arranged to adjust the position of the gage independently of the plural positioning members.

39. In a holder for heel-portions, a normally fixed gage for contact with a heel-portion, means arranged to adjust the position of the gage, a plurality of positioning members yieldable independently of the gage and of each other and arranged to contact with the same heel-portion as said gage, and means arranged to vary the normal location of the positioning members independently of the gage.

40. In a holder for heel-portions, a gage-bar arranged to contact at its end with the back of a heel-portion, and a fork yieldable longitudinally of the gage-bar.

41. In a holder for heel-portions, a gage-bar arranged to contact at its end with the back of a heel-portion, a fork yieldable longitudinally of the gage-bar, and a breast-bar yieldable with respect to the gage-bar.

42. In a holder for heel-portions, a gage-bar arranged to contact at its end with the back of a heel-portion, a fork yieldable along the gage-bar, and means arranged to vary the extent of movement of the fork.

43. In a holder for heel-portions, a gage-bar arranged to contact at its end with the back of a heel-portion, a breast-bar, a movable support for the breast-bar, and means arranged to vary the effective length of the support.

44. In a holder for heel-portions, opposite positioning members for contact with a heel-portion and movable in a line from front to rear of such heel-portion, one of said members being yieldably mounted, and a spring connecting the members.

45. In a holder for heel-portions, opposite movable positioning members for contact with a heel-portion, a spring connecting one of the members to a relatively fixed point, and a spring connecting the members to each other.

46. In a holder for heel-portions, an adjustable back gage-bar, a fork movable along the gage-bar, a breast-bar movable toward and from the gage-bar, and springs exerting their force upon the fork and breast-bar.

47. In a holder for heel-portions, an adjustable back gage-bar, a fork movable along the gage-bar, a breast-bar movable toward and from the gage-bar, a spring connecting the fork and breast-bar, and a spring connecting the breast-bar and a relatively fixed point.

48. In a machine of the class described, oppositely movable work-positioning members, a locking member movable into contact with the positioning members, and an actuating member for the locking member movable in a direction opposite thereto.

49. In a machine of the class described, oppositely movable work-positioning members, and a locking member movable by the work between and into contact with the positioning members.

50. In a machine of the class described, work-positioning members oppositely movable by the work and having curved surfaces, and a locking member having oppositely inclined surfaces movable into contact with said curved surfaces.

51. In a machine of the class described, oppositely movable work-positioning members having curved surfaces, and a locking member having oppositely inclined surfaces movable into contact with said curved surfaces, separating pressure upon the positioning members tending by the engagement of the surfaces to increase the locking effect.

52. In a machine of the class described, oppositely movable work-positioning members arranged for separation by said work, means for yieldably moving the positioning members toward each other, and a member movable to lock the positioning members against separation, such locking member leaving the positioning members free for their mutual approach.

53. A counter-clamp comprising opposite pivoted jaws, and a locking wedge movable under the influence of the work and co-operating with the jaws.

54. A counter-clamp comprising opposite pivoted jaws, a locking wedge co-operating with the jaws, a back stop movable by the shoe to be clamped, and connections between the back stop and wedge.

55. A counter-clamp comprising opposite pivoted jaws, a locking wedge for the jaws, a spring acting to hold the wedge normally out of co-operation with the jaws, a back stop movable by the shoe to be clamped, and gearing connecting the back stop and wedge.

56. The combination with a movable shoe-supporting jack, of a shoe-locating clamp comprising opposite pivoted jaws arranged to engage the counter portion of a jacked shoe, gearing connecting the jaws, a spring acting to swing the jaws toward each other, and an adjusting device contacting with one of the jaws to limit the movement of said jaws under the influence of the spring.

57. In a machine for operating upon shoes, a counter-clamp, and a forepart-gage spaced from the counter-clamp, the distances between the longitudinal axis of the shoe operated upon and the points of contact of said shoe with the clamp and gage respectively being in a constant ratio for shoes of different sizes.

58. In a machine for operating upon shoes, a movable member for contact with the counter-portion of a shoe, and a gage carried by said member for contact with the shoe forward of its counter-portion.

59. In a machine for operating upon shoes, a movable member for contact with the counter-portion of a shoe, a gage carried by said member for contact with the shoe forward of its counter-portion, and means arranged to adjust the point of contact of the gage member with the shoe.

60. In a machine for operating upon shoes, a movable member for contact with the counter-portion of a shoe, a gage carried by said member for contact with the shoe forward of its counter-portion, means arranged to adjust the gage longitudinally of the shoe, and means arranged to adjust the gage transversely of said shoe.

61. In a heel-attaching machine, a counter-clamp including a movable jaw, a support variable in position along the jaw, and a gage mounted upon the support and variable in position with respect to a shoe engaged by the clamp.

62. In a heel-attaching machine, a counter-clamp including a movable jaw, a support variable in position along the jaw, a carrier movable upon the support, and a gage variable in position upon the carrier.

63. In a machine for operating upon shoes, a gage arranged for movement in the operation of the machine and having a portion arranged to extend transversely in contact with the bottom of a shoe operated upon and an adjacent gage-surface for engagement with the edge of the shoe-bottom.

64. In a machine for operating upon shoes, a gage having a portion arranged to extend transversely of the bottom of a shoe operated upon and an adjacent gage-surface for engagement with the edge of the shoe-bottom, said gage being arranged to yield in a direction substantially perpendicular to the shoe-bottom.

65. In a machine for operating upon shoes, a gage having a portion arranged to extend transversely of the bottom of a shoe operated upon and an adjacent gage-surface for engagement with the edge of the shoe-bottom, and means arranged to adjust the gage perpendicularly with respect to the shoe-bottom and toward and from the edge.

66. In a heel-attaching machine, a counter-clamp including a movable jaw, a support mounted upon the jaw, and a gage yieldable upon the support.

67. In a heel-attaching machine, a counter-clamp including a movable jaw, a support variable in position along the jaw, a carrier variable in position upon the support perpendicularly with respect to the bottom of a clamped shoe, and a gage adjustable upon the carrier transversely of said shoe.

68. In a heel-attaching machine, a counter-clamp including a movable jaw, a support variable in position along the jaw, a carrier variable in position upon the support and having a yieldable portion, and a gage adjustable upon said yieldable portion.

69. In a heel-attaching machine, nail-driving mechanism, movable loading mechanism co-operating therewith, a movable heel- and top-lift-holder, and connections to the loading mechanism arranged to move the holder.

70. In a heel-attaching machine, nailing mechanism including a die-block and its holder, a guide extending along the die-block-holder, a holder-plate mounted to slide upon the guide, a loader-arm pivoted to oscillate over the die-block-holder, and connections pivoted to the loader-arm for sliding said plate.

71. The combination with nailing mechanism having a die-block and reciprocatory drivers, there being ways associated with the die-block, of a heel-holder mounted to reciprocate longitudinally upon the ways, means for moving the holder from one extremity of the ways to the other, a latch for retaining the holder against the force of the moving means, and means movable with the drivers for releasing the latch.

72. The combination with nailing mechanism, of a reciprocatory heel-base and top-lift-holder, means arranged to move the holder into position to present a base to the nailing mechanism, a spring exerting its force to move the holder into top-lift-presenting position, a latch engaging the holder, and means for releasing the latch.

73. The combination with nailing mechanism, of a reciprocatory heel-base and top-lift-holder, means arranged to move the holder into position to present a base to the nailing mechanism, a spring exerting its force to move the holder into top-lift-presenting position, a latch for temporarily retaining the holder in its base-presenting position, and means movable by the nailing mechanism for releasing the latch.

In testimony whereof I have signed my name to this specification.

JOHN M. BENJAMIN.